Oct. 17, 1944. S. T. BELL 2,360,328
SHORTHAND TEXT AND PRACTICE BOOK
Filed April 21, 1943

Inventor
STANLEY T. BELL
By

Patented Oct. 17, 1944

2,360,328

UNITED STATES PATENT OFFICE 2,360,328

SHORTHAND TEXT AND PRACTICE BOOK

Stanley T. Bell, Washington, D. C.

Application April 21, 1943, Serial No. 483,838

1 Claim. (Cl. 283—45)

(Granted under the act of March 3, 1883, as amended April 30, 1928; 370 O. G. 757)

This invention relates to a shorthand text and copy book and has for an object to provide an improved combination shorthand textbook and practice book especially useful both in teaching shorthand and in practicing shorthand with, but preferably without, the aid of an instructor.

A further object of this invention is to provide a notebook useful both as a textbook for elementary training in shorthand and as a practice book for advanced practice in shorthand, thus enabling the student to take his elementary training with or without an instructor and to take advanced practice training at one's own convenience without the necessity of having an instructor present.

A further object of this invention is to provide an improved shorthand practice book especially useful for a shorthand student for practicing shorthand so as to increase on'e speed of taking notes as rapidly as possible without being restricted to any arbitrary speed by the dictation of an instructor.

A still further object of this invention is to provide an inexpensive shorthand textbook which may be also used as a practice book enabling the student to practice the taking of notes at the most advanced speed within one's capabilities without any restriction by any arbitrary rate of speed from an instructor, thus enabling the student to prepare for high-speed dictation in the least possible time.

With the foregoing and other objects in view, the invention consists in the construction, combination and arrangement of parts hereinafter described and illustrated in the drawing in which.

There is shown at 10 a combination shorthand text book and practice book of this invention. This book 10 is made up in a conventional style that any shorthand notebook is made and may be bound in any usual manner as by the rings 11.

Figure 2:
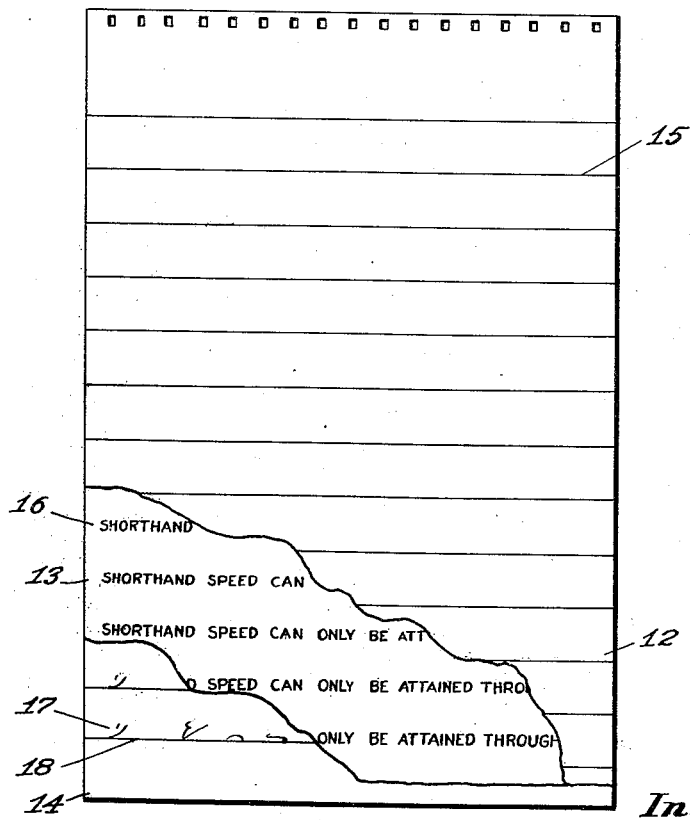
Fig. 2 is an elevation partly broken away view of several superimposed sheets of the book shown in Fig. 1.

This book 10 includes as many sets of sheets as may be necessary, each set of sheets as shown in Fig. 2 consisting of three sheets 12, 13 and 14. The top sheet 12 as shown is on thin semi-transparent paper printed with spaced lines 15 thereon, this sheet 12 being intended for receiving hand written notes from the student. The sheet 13 has appropriate text matter printed thereon as at 16, the lines of the text 16 being spaced apart a distance equal to the spacing of lines 15 on the sheet 12. The sheet 12 is of such transparency that when it is placed directly over the sheet 13 the printed matter on the sheet 16 will be visible therethrough but will appear between the lines 15. The student may hold the book 10 in the conventional shorthand-taking position and can write on the sheet 12 along the lines 15, making shorthand characters appear on the lines corresponding to the text matter visible through the sheet. Obviously a surplus number of sheets 12 may be provided, either incorporated in the book or available separately therefrom, enabling the student to practice the same text over and over again as may be necessary to reach perfection.

On semi-transparent sheet 14 the proper shorthand characters shown at 17 have been printed thereon by the publishers on a set of lines 18, spaced apart equal to the spacing of the lines 15. As a beginners' textbook, the sheet 14 may be removed from its position in the book and placed over the corresponding printed text matter, thus enabling the student to compare the printed characters 17 with the printed text matter 16 for study purposes until the student is familiar therewith. Of course, the text matter and the shorthand characters for the beginner will be made up of elementary subject matter at the beginning of the book and then become more advanced progressively through the book in the same manner as in any textbook.

After the student has studied the printed shorthand characters 17 so as to become familiar with them in comparison with the printed text matter 16, he or she may remove the sheet 14 from over the printed matter 16 and substitute the blank sheet 12 therefor and then attempt to copy the printed matter 16 in shorthand notes on the sheet 12. After he has transcribed a page, he can test himself by inserting any blank opaque sheet of paper between his handwritten notes on sheet 12 and the printed text matter 16 on the sheet 13 and read the same back to himself. Should he find any character that he cannot readily transcribe, he can easily learn what the word is supposed to be by slipping the opaque sheet down until the printed text is visible just above his written notes.

It will be observed from Fig. 2 that the spacing of the lines 18 on the printed shorthand notes 17 on the sheet 14 are one-half space above the lines 15 on sheet 12 when they are both in the book 10. By superimposing one's handwritten shorthand notes on the sheet 12 over the printed shorthand notes on the sheet 14 and placing the combined sheets over the opaque sheet, the student can readily compare his handwritten shorthand notes with the printed shorthand notes and thus ascertain which outlines are incorrect so that he will know his weaknesses and can practice on such to perfect himself.

Figure 1:
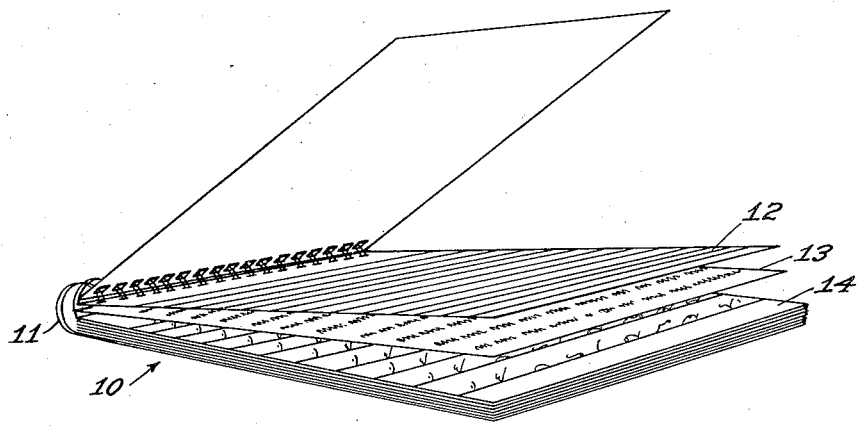
Fig. 1 is a perspective of one form of the text and practice book of this invention.

While the textbook in Fig. 1 has been shown as having covers fastened with slip rings, it might be desirable, when a more permanent form of textbook is preferred to use any conventional slip fastening means, enabling the sheets to be more readily removed and replaced.

The terms semi-transparent as used herein means any degree of transparency or translucency sufficient to enable the written or printed characters beneath the transparent sheet to be visible therethrough.

By using this invention, the advanced student can practice his shorthand characters at any desired speed, increasing his speed as he becomes more proficient, without the necessity of having to take notes from an instructor at an arbitrary speed.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A combination shorthand text and practice book comprising a plurality of sets of sheets, one sheet of each set having printed shorthand instruction and practice matter thereon, another sheet of each set being semi-transparent and provided with lines for receiving shorthand outlines thereon, the lines on said semi-transparent sheet and the lines of text on the printed sheet being correspondingly spaced, each set also including an additional semi-transparent sheet with printed shorthand outlines thereon, said printed shorthand outlines being spaced a fraction of a space out of alignment with the lines of said first mentioned semi-transparent sheet, enabling said printed shorthand outline sheet to be superimposed over said printed text matter for studying the printed outlines or over shorthand outlines handwritten on said first mentioned semi-transparent sheet, enabling the student to compare and detect inaccuracies in the handwritten outlines.

STANLEY T. BELL.